(12) United States Patent
Schueler (10) Patent No.: US 10,549,678 B1
(45) Date of Patent: Feb. 4, 2020

(54) SYSTEM AND METHOD FOR A VEHICLE CONTROL SYSTEM

(71) Applicant: Gentex Corporation, Zeeland, MI (US)

(72) Inventor: Kevin A. Schueler, Grand Haven, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/207,822

(22) Filed: Dec. 3, 2018

(51) Int. Cl.
*B60Q 1/06* (2006.01)
*B60Q 1/14* (2006.01)
*B60Q 1/00* (2006.01)
*B60Q 1/30* (2006.01)

(52) U.S. Cl.
CPC ........... *B60Q 1/143* (2013.01); *B60Q 1/0023* (2013.01); *B60Q 1/30* (2013.01); *B60Q 2300/43* (2013.01)

(58) Field of Classification Search
CPC . B60Q 1/06; B60Q 1/143; B60Q 1/30; B60Q 1/0023; B60Q 2300/43
USPC ......................................................... 362/466
See application file for complete search history.

(56) References Cited

U.S. PATENT DOCUMENTS

| 2009/0251909 | A1* | 10/2009 | Wu ........................ B60Q 1/44 362/487 |
| 2011/0267184 | A1* | 11/2011 | Lee ....................... B60Q 9/005 340/435 |
| 2012/0161951 | A1* | 6/2012 | Ito ......................... B60Q 9/008 340/435 |
| 2013/0223686 | A1* | 8/2013 | Shimizu ................. G08G 1/166 382/103 |
| 2014/0266655 | A1* | 9/2014 | Palan ................. G06K 9/00805 340/435 |

* cited by examiner

*Primary Examiner* — Ali Alavi
(74) *Attorney, Agent, or Firm* — Price Heneveld LLP; Bradley D. Johnson (57) ABSTRACT

A vehicle control system comprising an image sensor operable to capture image data corresponding to a field of view rearward of a vehicle. The vehicle control system further comprises a processor in communication with the image sensor. The processor is operable to receive the image data from the image sensor, analyze the image data and based on the analyzed image data, identify at least one characteristic of a trailing vehicle. The processor is operable to generate a control signal to adjust an illumination pattern of at least one taillight of the vehicle.

21 Claims, 5 Drawing Sheets

SYSTEM AND METHOD FOR A VEHICLE CONTROL SYSTEM

FIELD OF THE DISCLOSURE

The present disclosure generally relates to a system and method for processing image data for a vehicle control system, and more particularly, a vehicle control system for adjusting illumination pattern for vehicles taillights.

BACKGROUND OF THE DISCLOSURE

When driving a vehicle down a roadway there can be a variety of different road conditions or scenarios that can impede on the view of a vehicle's taillights. Variations in the road, such as curves or hills, or environment conditions, such as fog or snow, can affect the ability of a trailing vehicle to view the taillights. Standard taillights are not adjustable and may not be illuminating at an optimal viewing angle for the present environmental condition.

SUMMARY OF THE DISCLOSURE

According to one aspect of the present disclosure, a vehicle control system comprises an image sensor operable to capture image data corresponding to a field of view rearward of a vehicle. The vehicle control system further comprises a processor in communication with the image sensor, wherein the processor is operable to receive the image data from the image sensor. The processor is further operable to analyze the image data and based on the analyzed image data, identify at least one characteristic of a trailing vehicle. Based on the identified characteristic of the trailing vehicle, generate a control signal to adjust an illumination pattern of at least one taillight of the vehicle.

According to another aspect of the present disclosure, a method for a vehicle control system comprises the steps of capturing, with an imager, image data corresponding to a field of view rearward of the vehicle. The method further comprises processing, with a processor, the image data. The method further comprises identifying, with the processor, at least one characteristic of a trailing vehicle and based on the at least one characteristic generating, with the processor, a control signal to adjust an illumination pattern of at least one taillight of the vehicle.

According to another aspect of the present disclosure, a vehicle control system comprises an image sensor operable to capture image data corresponding to a field of view rearward of a vehicle. The vehicle control system further comprises a processor in communication with the image sensor. The processor is operable to receive the image data from the image sensor. The processor is further operable to analyze the image data and based on the analyzed image data, identify at least one characteristic of a roadway. Based on the identified characteristic of the roadway, the processor is operable to generate a control signal to adjust an illumination pattern of at least one taillight of the vehicle.

According to yet another aspect of the present disclosure, A vehicle control system comprises a transceiver configured to send and receive wireless communication for at least one surrounding vehicle. A processor in communication with the transceiver, wherein the processor is operable to receive the vehicle wireless communication. The processor is further operable to analyze the vehicle wireless communication. Based on the analyzed wireless communication, the processor identifies the location of the last least one surrounding vehicle relative to the control vehicle. Further, based on the identified location of the at least one surrounding vehicle, the processor generates a control signal to adjust an illumination pattern of at least one taillight of the control vehicle.

These and other features, advantages, and objects of the present disclosure will be further understood and appreciated by those skilled in the art by reference to the following specification, claims, and appended drawings.

BRIEF DESCRIPTION OF THE DRAWINGS

The invention will now be described with reference to the following drawings, in which.

DETAILED DESCRIPTION

The present illustrated embodiments reside primarily in combinations of method steps and apparatus components related to a vehicle control system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Every newer vehicle on the road today is equipped with a variety of different sensor systems, many dealing with the orientation and location of the vehicle. Most vehicles are equipped with three taillights and the taillights on a vehicle have a standard illumination pattern to the rear of the vehicle. The standard illumination pattern is not always optimal, depending on the location and orientation of the vehicle relative to the road it is traveling on. Other factors such as the current weather conditions (e.g. snow, fog or rain), or time of day, can also play a role in the visibility of the taillights. According to some embodiments of the present disclosure, one or more vehicle sensors are used to determine an optimal taillight illumination pattern for a vehicle, based on a current vehicle location, the location of a trailing vehicle and/or an environmental condition.

Figure 1:
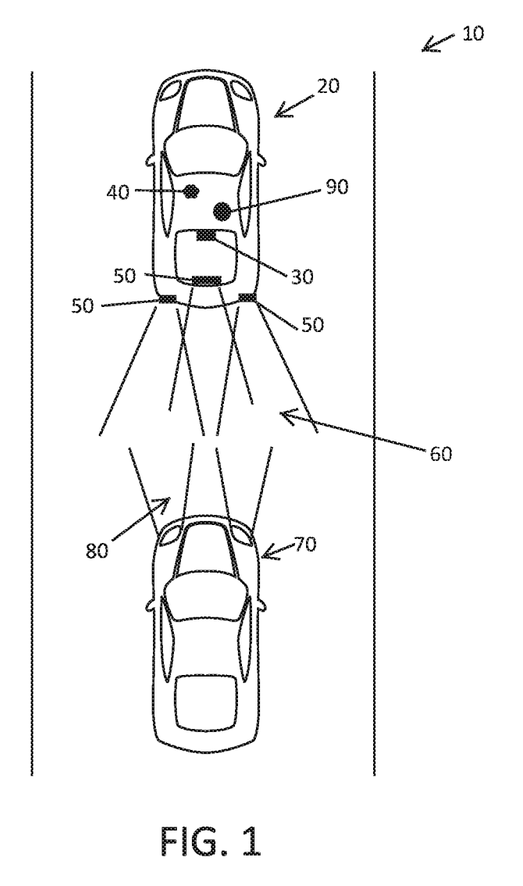
FIG. 1 is a top elevational view of one embodiment of a vehicle control system of the present disclosure.

FIG. 1 shows a vehicle control system 10 for a vehicle 20. System 10 may have one or more image sensor(s) 30. Image sensor 30 can be in communication with a processor 40. Processor 40 may use the image data from sensors 30 to identify at least one characteristic of a trailing vehicle 70. A trailing vehicle may have features detectable by system 10, such as headlights 80. Processor 40 can generate a control signal to adjust an illumination pattern 60 of at least one taillight(s) 50 of vehicle 20.

Vehicle 20 may be any type of vehicle that travels on a roadway and may be operated by a driver and/or an autonomous system. Image sensor 30 can be mounted anywhere on the vehicle 20, in order to view a scene, such as a scene approximately rearward of the vehicle 20, viewing a scene to the side of vehicle 20, a scene exterior of vehicle 20, and/or a combination thereof.

Image sensor 30 is shown in communication with processor 40. Image sensor 30 may be a pixel array imager and correspond to a CMOS image senor, for example a CMOS active-pixel sensor (APS) or a charge coupled device (CCD). Each pixel of the pixel array may correspond to a photo-sensor, an array of photo-sensors, or any grouping of sensors configured to capture light. Processor 40 is operable to process image data as supplied in analog or digital form in image sensor 30. Image sensor(s) 30 views a scene generally to the rear of vehicle 20. Image sensor 30 can be a single imager or a plurality of imagers such as a stereo camera system. The image data from image sensor 30 may provide orientation or location data of vehicle 20 relative to a trailing vehicle 70.

Processor 40 may represent or include any form of processing component, including general purpose computers, dedicated microprocessors, or other processing devices capable of processing electronic information. Examples of processor 40 include digital signal processors (DSPs), application-specific integrated circuits (ASICs), field-programmable gate arrays (FPGAs), and any other suitable specific or general purpose processors. Although FIG. 1 illustrates a particular embodiment of system 10 that includes a single processor 40, system 10 may, in general, include any suitable number of processors 40. Processor 40 is operable to process image data as supplied in analog or digital form in image sensor 30. For example, processor 40 may be implemented as a plurality of processors, a multicore processor, or any combination of processors, circuits, and peripheral processing devices. Processor 40 may comprise a plurality of modules configured to process the image data.

Taillight(s) 50 may be any rearward facing light located on a vehicle and configured to illuminate a rearward pattern 60 relative to vehicle 20. Taillight 50 is configured to selectively emit light from at least one of a single or a plurality of light portions. The light portions may correspond to a plurality of light emitting sources such as a matrix of light emitting sources. Taillights 50 has an illumination pattern that can be adjusted individually and/or together. Taillight 50 may be illuminated by a filament light bulb or a light-emitting diode (LED) array and/or any suitable illumination device used on a vehicle.

Illumination pattern 60, which may be referred to as generically as "illumination pattern 60" or collectively as "illumination patterns 60", may be the area that is illuminated by at least one taillight 50. The illumination patterns 60 may be adjusted in system 10 to allow for an optimal viewing angle from taillights 50 to reach trailing vehicle 70. Illumination pattern 60 may be adjusted based on the image data from sensors 30 which may provide orientation and/or location data for vehicle 20 and/or vehicle 70. The illumination pattern 60 of each taillight 50 in operation can be adjusted or altered individually or collectively.

Vehicle sensor 90 may detect and/or sense at least one or more of a vehicle pitch, a vehicle yaw, a vehicle turn, a vehicle braking, a vehicle acceleration, a vehicle location or any other operating information related to the operation or travel of vehicle 20. Vehicle sensor 90 may comprise a pitch sensor, a steering angle sensor, a bank sensor, a braking sensor, an acceleration sensor and/or a global positioning system (GPS) receiver. Vehicle sensor 90 may detect and/or sense operating information and may be in communication with processor 40. In some embodiments, processor 40 uses information from vehicle sensor 90 to generate a control signal, which may indicate an adjustment to illumination pattern 60. Vehicle sensor 90 may comprise one or more separate components or a single component of vehicle 20.

In operation, embodiments of the present disclosure adjust an illumination pattern 60 of taillights 50 for an optimal viewing angle for various environmental conditions. These different environmental conditions can be, for example, variations in the roadway, variations in the weather and/or detection of objects. In general, vehicle control system 10 may include an image sensor 30. Image sensor 30 is operable to capture image data corresponding to a field of view generally rearward of vehicle 20. A processor 40 may be in communication with image sensor 30. Processor 40 may be operable to receive the image data from the image sensor 30 and analyze the image data to identify at least one characteristic of a trailing vehicle 70 and/or a roadway condition (for example, a curved or straight road). Processor 40 may be further operable to generate a control signal to adjust an illumination pattern 60 of taillights 50. The illumination pattern 60 is based on the analyzed image data and is adjusted to illuminate the optimal portion of the roadway and/or the viewing area of trailing vehicle 70.

Operation of system 10 may begin by starting vehicle 20. In some embodiments system 10 can be activated by placing vehicle 20 in drive or turning the ignition to the on position. When system 10 is activated, image sensor 30 may be configured to begin capturing image data to a scene approximately rearward of vehicle 20.

Image sensor 30 begins to capture image data generally rearward of vehicle 20. Image sensor 30 is shown in communication with processor 40. Image sensor 30 may be a pixel array imager and correspond to a CMOS image senor, for example a CMOS active-pixel sensor (APS) or a charge coupled device (CCD). Each pixel of the pixel array may correspond to a photo-sensor, an array of photo-sensors, or any grouping of sensors configured to capture light. Image sensor 30 can be a single imager or a plurality of imagers such as a stereo camera system. The image data from image sensor 30 may provide orientation or location data of vehicle 20 relative to a trailing vehicle 70. Image sensor 30 may capture image data continuously over time or capture image data in snapshots taken at predetermined intervals.

Processor 40 may be configured to complete one or more image processing steps on the image data to determine the presence of a trailing vehicle 70 and the position of trailing vehicle 70 relative to vehicle 20. The location of trailing vehicle 70 identified in the image data may be utilized by processor 40 to identify an optimal illumination pattern 60 of taillights 50. Based on the features identified by processor 40 in the image processing steps, processor 40 may be operable to generate one of more offsets (for example, vertical or horizontal) that may be applied in a taillight aim adjustment step to adjust an illumination pattern 60 of at least one taillight 50. Processor 40 may generate one or more control signals to adjust illumination pattern 60. Processor 40 may also generate a control signal to adjust the illumination intensity of at least one taillight 50.

If system 10 does not determine that a trailing vehicle 70 is detected, no adjustment may be performed to illumination pattern 60. System 10 may continue to capture image data. If trailing vehicle 70 is detected, processor 40 may determine the location of trailing vehicle 70. Location of vehicle 70 may be determined by the location of one or more objects (for example, trailing vehicle 70 or headlights 80) in a plurality of image frames of the image data to determine the vertical offset, horizontal offset and/or the rotational offset of trailing vehicle 70 relative to the location of vehicle 20.

Processor 40 may identify a location of the features and/or objects in the image data and may also compare one or more objects in subsequent image frames to generate a taillight control signal. A taillight control signal may be used by components of vehicle 20 to control one or more illumination patterns 60 of taillights 50. Based on the comparison of the subsequent image frames, at least one taillight 50 may be adjusted. At least one taillight 50 may be configured to emit light from a single light source and/or selectively emit light from a plurality of lighting portions. The lighting portions may correspond to a plurality of light emitting sources. In some embodiments, the plurality of light emitting sources may correspond to a matrix of light emitting sources such as LED's. Processor 40 may control the vertical and/or horizontal illumination pattern 60 of the at least one taillight 50 by selectively activating each of the lighting portions of the matrix to output illumination pattern 60 at a plurality of elevations. Processor 40 may also be configured to alter illumination pattern 60 by panning and/or rotating taillight 50.

Additionally or alternatively, in one or more of the above described embodiments, system 10 may include a vehicle sensor 90 and/or may be in communication with the vehicle bus. Processor 40 may also take advantage of the availability of signals (such as vehicle speed, steering wheel angle, pitch, roll, and yaw) communicated over the vehicle bus in facilitating the operation of taillights 50. As one example, a vehicle steering angle sensor provides vehicle heading information over a vehicle bus to the processor 40, from which vehicle heading can be derived. The vehicle steering angle can be a factor in determining the control signal for taillights 50. For example, if vehicle 20 is determined to be traveling straight on the road and a trailing vehicle 70 is detected and is passing vehicle 20, taillights 50 do not necessarily need to be adjusted. Accordingly, processor 40 may not send a control signal to change illumination pattern 60. As another example, a reverse signal indicates to processor 40 over the vehicle bus that vehicle 20 is in reverse. Taillights 50 may not need to be adjusted when the vehicle is in reverse due to the typical slow speeds at which a vehicle travels in reverse. An auto ON/OFF switch input may be included to indicate to processor 40 whether the illumination pattern 60 should be automatically or manually controlled, for example if the vehicle is traveling on a straight roadway or is in reverse the system may be automatically deactivated. An ON/OFF switch may be used to manually deactivate system 10 so no illumination pattern 60 adjustment will be performed.

In some embodiments, system 10 may use vehicle 20 operating parameters determined by vehicle sensor 90. Operating parameters may include, but are not limited to, vehicle yaw, vehicle speed, vehicle steering wheel angle, and/or a history of the past driving conditions. Vehicle sensor 90 may also include a GPS module and may detect location information and time information of a vehicle 20. The GPS module may measure distance information from three or more satellites and detect time information at which the distance information is measured. Then, the GPS module may apply a triangulation method to the measured distance information so as to detect three-dimensional location information based on the latitude, longitude, and altitude. System 10 may use operating parameters to detect the presence of a curve in the road and then adjust illumination pattern 60 of taillights 50 in response to the curve. When a curve in the road has been detected, processor 40 generates a signal in response thereto that controls taillight 50 to adjust illumination pattern 60, until such time that vehicle 20 is no longer determined to be driving on a curved road. If processor 40 does not directly control taillights 50 (for example, processor 40 is in communication with the vehicle bus that controls the taillights 50), detection of a curve in the road may cause processor 40 to generate a signal that (1) indicates the detection of the curve and (2) indicates that illumination pattern 60 should be adjusted. Other components of vehicle 20 may be in communication on the vehicle bus and processor 40 may use the information provided over the vehicle bus to adjust illumination pattern 60.

Technical advantages of the present disclosure may include providing an optimal perceived illumination pattern 60 of taillights 50 for trailing vehicle 70. In normal operating conditions the illumination pattern 60 of taillights 50 may not be at an optimal viewing angle for trailing vehicle 70. Thus, advantages provided by embodiments of the present disclosure may include being able to adjust the illumination pattern 60 to more directly illuminate upon trailing vehicle 70, thereby increasing safety and ensuring that trailing vehicle 70 will see the taillights 50 of vehicle 20.

Technical advantages of the present disclosure may also include providing the ability to adjust the perceived illumination brightness of taillights 50, depending on environmental conditions. During low light ambient conditions, the perceived illumination of taillights 50 may be brighter than in day time conditions. The illumination intensity needed in low ambient conditions is less than the intensity needed during daytime conditions and can be adjusted in accordance with the sensed ambient conditions using image sensor 30 and/or vehicle sensor 90. For example, the illumination intensity of taillights 50 may be decreased as ambient lighting levels decrease because the taillights 50 are more easily visible. In conditions such as fog or snow, where visibility can be hindered, a higher illumination level for taillights 50 can be provided to compensate for the lower visibility. By providing the ability to optimally direct illumination pattern 60, thereby enabling a lower illumination intensity, the embodiments of the present disclosure may extend the life of taillight 50 because it is not always drawing the maximum power and illuminating at the maximum illumination level.

Figure 2:
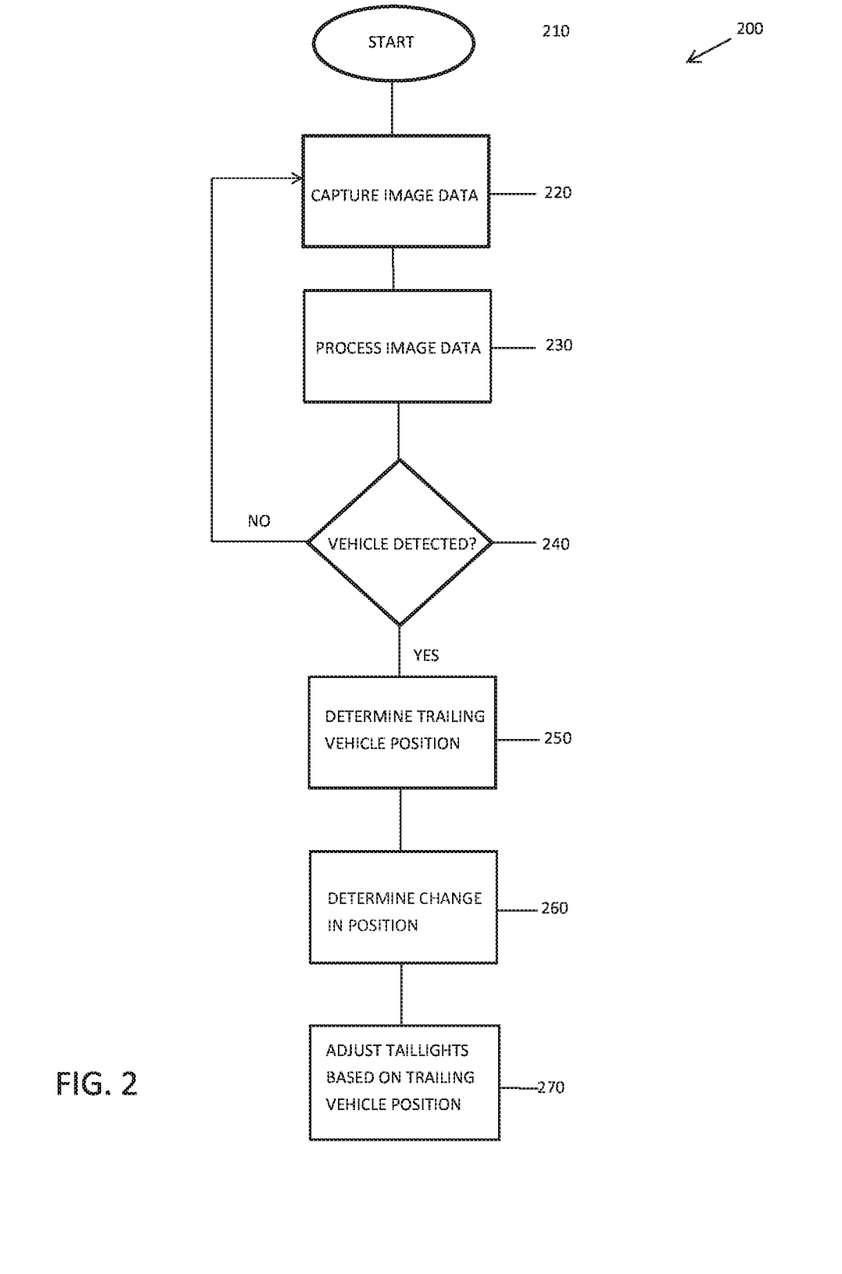
FIG. 2 is a flow chart of the vehicle control system of FIG. 1

Referring now to FIG. 2, a process diagram 200 is shown demonstrating a method to adjust the illumination pattern 60 of one or more taillights 50. The method may begin by capturing the image data via the imager 30 and communicating the image data to processor 40. Processor 40 may be configured to perform one or more image processing steps on the image data to determine features of various different objects such as a trailing vehicle 70. The objects identified in the image data may be utilized by the processor to identify an optimal illumination pattern 60 for taillights 50.

In step 210, system 200 is activated. In some embodiments, starting vehicle 20 initiates system 200. In another embodiment system 200 can be activated by placing vehicle 20 in drive or turning the ignition to the on position. When system 200 is activated, image sensor 30 may be configured to begin capturing image data to a scene approximately rearward of vehicle 20.

In step 220, image sensor 30 begins to capture image data generally rearward of vehicle 20. Image sensor 30 is shown in communication with processor 40. Image sensor 30 may be a pixel array imager and correspond to a CMOS image senor, for example a CMOS active-pixel sensor (APS) or a charge coupled device (CCD). Each pixel of the pixel array may correspond to a photo-sensor, an array of photo-sensors, or any grouping of sensors configured to capture light. Image sensor 30 can be a single imager or a plurality of imagers such as a stereo camera system. The image data from image sensor 30 may provide orientation or location data of vehicle 20 relative to a trailing vehicle 70. Image sensor 30 may capture image data continuously over time or capture image data in snapshots taken at predetermined intervals.

In step 230, processor 40 may be configured to complete one or more image processing steps on the image data to determine the presence of a trailing vehicle 70 and the position of trailing vehicle 70 relative to vehicle 20. The location of trailing vehicle 70 identified in the image data may be utilized by processor 40 to identify an optimal illumination pattern 60 of taillights 50. An optimal illumination pattern 60 may be one that is more directly focused on trailing vehicle 70. Based on the features identified by processor 40 in the image processing steps 230, processor 40 may be operable to generate one or more offsets (for example, vertical or horizontal) that may be applied in a taillight aim adjustment step to adjust illumination pattern 60 of at least one taillight 50.

In step 240, if no trailing vehicle 70 is detected the system returns to step 220 where it captures image data and no adjustment is performed to illumination pattern 60. If trailing vehicle 70 is determined in step 240, operation proceeds to step 250.

In step 250, the location of trailing vehicle 70 is determined. Location of vehicle 70 may be determined by the location of one or more objects (for example, trailing vehicle 70 or headlights 80) in a plurality of image frames of the image data to determine the vertical offset, horizontal offset and/or the rotational offset of trailing vehicle 70 relative to the location of vehicle 20. Once the location of trailing vehicle 70 is determined, the operation proceeds to step 260.

In step 260, processor 40 may identify a location of the features and/or objects in the image data and may also compare one or more objects in subsequent image frames to generate a taillight control signal, to control one or more illumination patterns 60 of taillights 50.

In step 270, based on the comparison of the subsequent image frames, illumination pattern 60 of at least one taillight 50 is adjusted. Processor 40 may adjust illumination pattern 60 to more directly illuminate trailing vehicle 70. At least one taillight 50 may be configured to emit light from a single light source and/or selectively emit light from a plurality of lighting portions. The lighting portions may correspond to a plurality of light emitting sources. In some embodiments, the plurality of light emitting sources may correspond to a matrix of light emitting sources such as LED's. Processor 40 may control the vertical and/or horizontal illumination pattern 60 of the at least one taillight 50 by selectively activating each of the lighting portions of the matrix to output illumination pattern 60 at a plurality of elevations. Processor 40 may also be configured to alter illumination pattern 60 by panning/rotating taillight 50.

Figure 3A:
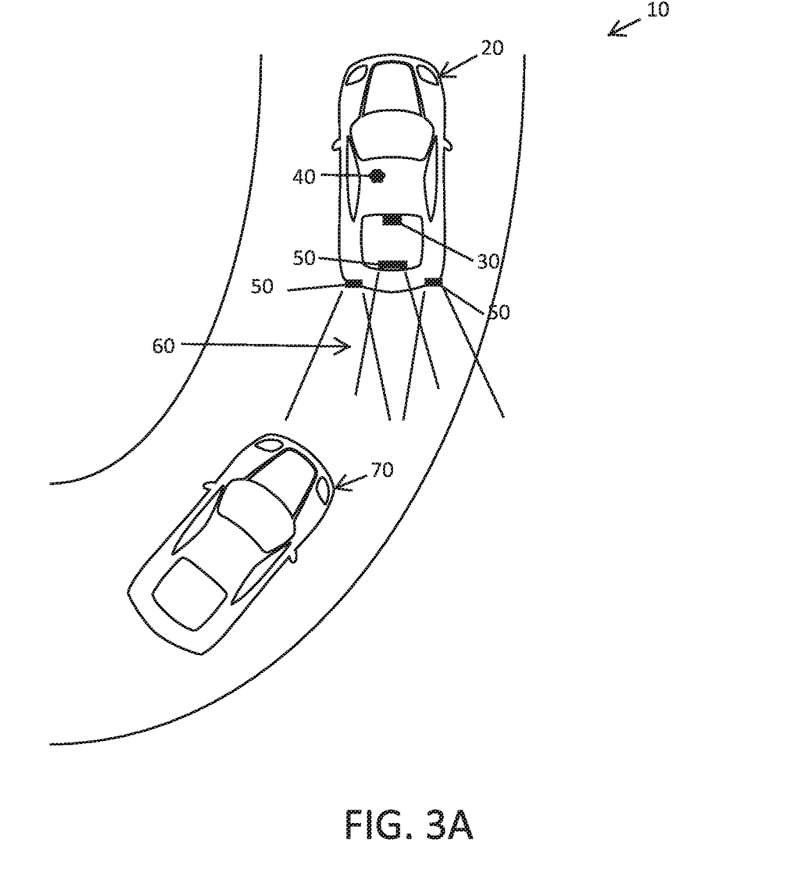
FIG. 3A is an environmental view of a vehicle having a vehicle control system demonstrating an illumination pattern.
Figure 3B:
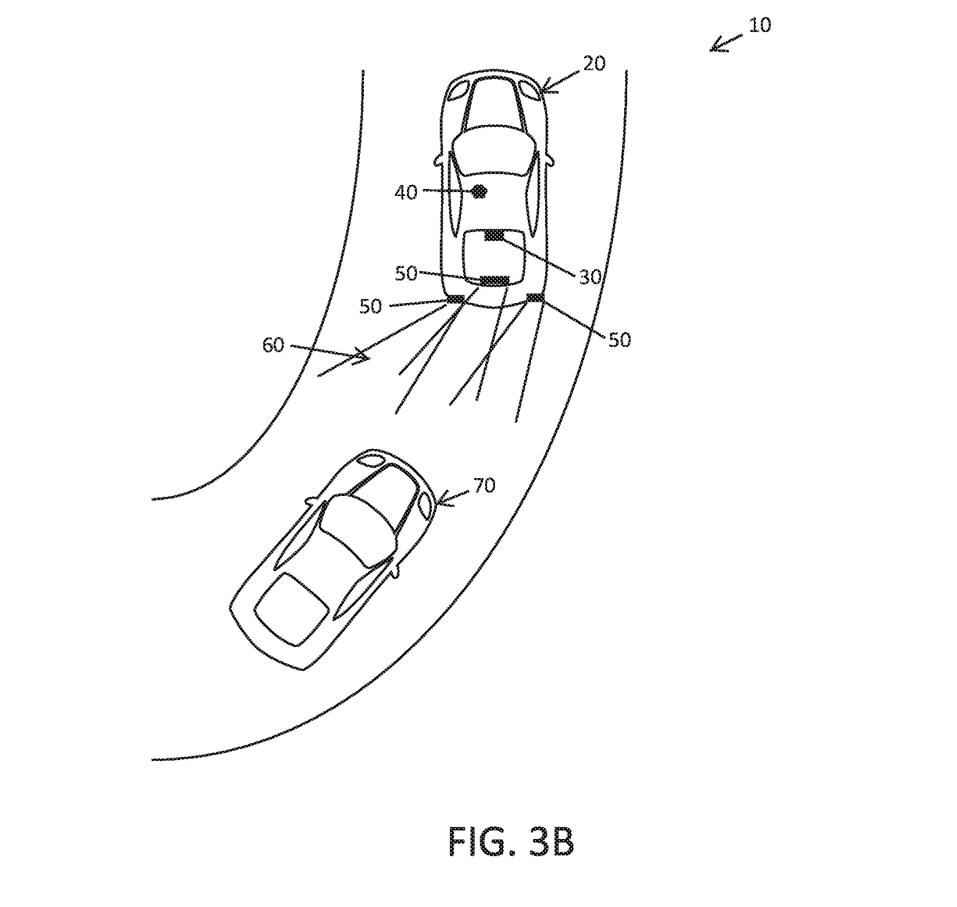
FIG. 3B is an environmental view of a vehicle having a vehicle control system demonstrating an illumination pattern while on a curved road.

Referring now to FIG. 3A and 3B, one embodiment of an altered illumination pattern 60 as vehicle 20 takes a curve in the road is shown. Vehicle 20 is shown in FIGS. 3A and 3B approaching a turn with a trailing vehicle 70. In FIG. 3A, as vehicle 20 begins to turn, illumination pattern 60 of taillights 50 is no longer at an appropriate viewing angle to be optimally viewed by trailing vehicle 70. It can be said that most of the illumination from taillights 50 is wasted and illumination pattern 60 is no longer directly on the roadway. Processor 40 determines a location of vehicle 70 based on the analyzed image data from image sensor 30. Processor 40 generates a control signal to alter illumination pattern 60 by, for example, activating certain LED's in a taillight 50 to illuminate the desired region. Once the optimal illumination pattern 60 is determined as seen in FIG. 3B, the illumination pattern 60 is then altered to illuminate the path to the rear of vehicle 20 that is easily visible to trailing vehicle 70.

In various embodiments processor 40 may be operable to control a panning and/or rotating operation of taillights 50. The panning operation may be controlled by processor 40 in response to vehicle 20 turning and/or traveling along a curved portion of a roadway. The panning operation may consist of changing the angle of the taillight bulb with the use of a mechanical device so that illumination pattern 60 is focused on the road during the curve. Panning and/or rotating illumination pattern 60 may comprise illuminating certain LED's in a taillight 50. Taillight 50 may have an array of LED's positioned to illuminate at different angles and/or patterns. By illuminating different LED's with different inputs the desired illumination pattern 60 can be achieved. Illumination pattern 60 of taillight 50 may be adjusted by panning and/or rotating the taillight bulb or may be adjust by moving the entire taillight housing.

Additionally or alternatively, taillights 50 may be operable in several different modes including the standard illumination brightness but may also be operable in different illumination modes depending on the time of day, weather conditions and/or the country vehicle 20 is located, in order to comply with vehicle laws and regulations. Taillight 50 brightness or illumination intensity may also be continuously varied to provide an optimal perceived brightness for trailing vehicle 70. A perceived brightness or illumination intensity may signify how taillight 50 appears to trailing vehicle 70. For example, a perceived brightness may indicate whether taillights 50 are bright enough for the environment conditions and whether illumination pattern 60 is easily viewable for trailing vehicle 70. The perceived brightness of taillights 50 may be altered by changing illumination output of one or more taillights 50, by steering one or more taillights 50 to change the aim of illumination pattern 60, and/or a combination of the above. In particular, processor 40 may be operable to determine an optimal illumination intensity and generate a second control signal that may adjust the illumination output of taillight 50.

Figure 4:
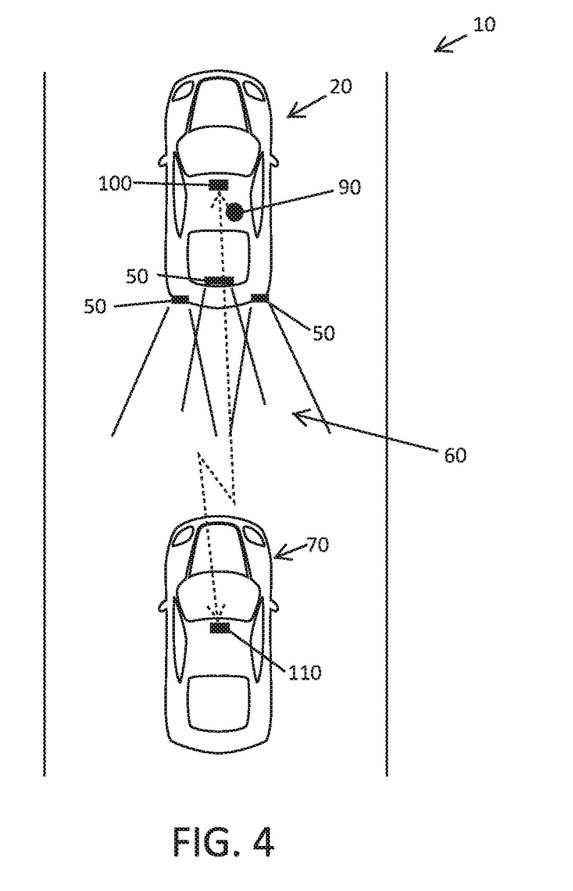
FIG. 4 is an elevational view of one embodiment of a vehicle control system of the present disclosure.

Referring now to FIG. 4, one embodiment of the present disclosure system 10 may include transceiver 100. Transceiver 100 may be configured to operate at a variety of different frequencies suitable for vehicle-to-vehicle communication, including but not limited to operation in the Bluetooth frequency range around 2.4 GHz or a vehicle-to-vehicle communication frequency between about 5 GHz and about 6 GHz. Transceiver 100 may comprise a transceiver or a transmitter component in communication with a receiver component to perform the operations described herein. System 10 may communicate location information determined by vehicle sensor 90 with one or more surrounding vehicle(s) using transceiver 100. Transceiver 100 may perform wireless communication between vehicle 20 and vehicle 70 through a short-range communication method (such as, e.g., V2V (Vehicle-to-Vehicle) communication), or any other suitable wireless communication. Vehicle 70 may also have a transceiver 110 to send information to and/or receive information from (a) surrounding vehicle(s). As discussed above, vehicle 20 may use transceiver 100 to send information, including telematics information, to and/or receive telematics information from vehicle 70. Telematics information may include one or more of location information, speed information, direction information, origin information, and destination information. In some embodiments, system 10 can use received telematics information to determine information, such as a location, direction of travel, and speed, about vehicle 70 relative to vehicle 20. Processor 40 can generate a control signal, based on information associated with each respective vehicle 20 and vehicle 70, to adjust illumination pattern 60. Additionally, vehicle 20 may be in communication with a plurality of different vehicles. Additionally or alternatively to telematics information described above, data such as vehicle identification information and/or time information can be communicated between vehicle 20 and vehicle 70 and can be used by processor 40 to determine the optimal illumination pattern 60.

In operation, system 10 may use vehicle information collected by vehicle sensor 90 to determine at least a location of vehicle 20. Transceiver 100 may transmit the determined location from vehicle 20 to vehicle 70. There may be one-way or two-way communication between vehicle 20 and vehicle 70 (shown in FIG. 4 with the dotted line). Vehicle 70 may also share its location data with vehicle 20 using transceiver 110. Once vehicle information (such as, e.g., location or other information), processor 40 can use vehicle information to determine a location of vehicle 70 relative to vehicle 20. Processor 40 can then generate a control signal, based on the analyzed data, to adjust illumination pattern 60 of taillights 50. For example, processor 40 determines that vehicle 20 is making a turn and that vehicle 70 is no longer directly behind vehicle 20. Processor 40 now determines an optimal illumination pattern 60 and adjusts the illumination pattern 60 to aim toward trailing vehicle 70. In another example, processor 40 determines that vehicle 70 is approaching or receding from vehicle 20 and may increase or reduce the brightness associated with taillight 50. In another example, processor 40 determines that vehicle 70 is moving to the left to pass vehicle 20 and vehicle 20 is remaining in its lane, determines an optimal illumination pattern 60 and maintains illumination pattern 60 to the rear of vehicle 20.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

The invention claimed is:

1. A vehicle control system comprising:
an image sensor operable to capture image data corresponding to a field of view rearward of a vehicle; and
a processor in communication with the image sensor, wherein the processor is operable to:
receive the image data from the image sensor;
analyze the image data;
based on the analyzed image data, identify at least one characteristic of a trailing vehicle; and
based on the identified characteristic of the trailing vehicle, generate a control signal to adjust an illumination pattern of at least one taillight of the vehicle.

2. The vehicle control system according to claim 1, wherein the generated control signal is operable to adjust the illumination pattern of the taillights by changing an illumination of at least one LED in an LED array.

3. The vehicle control system according to claim 1, wherein the generated control signal is operable to adjust the illumination pattern of the at least one taillight by adjusting a mechanical mechanism operably coupled to the taillight, the mechanical mechanism configured to rotate and/or pan at least one taillight to the indicated illumination pattern.

4. The vehicle control system according to claim 1, further comprising a vehicle sensor operable to provide an indication of at least one of a vehicle speed, steering wheel angle, pitch, roll, and yaw data to the processor, wherein the processor is further operable to generate a control signal to adjust an illumination pattern of at least one taillight of the vehicle based at least in part on the indication from the vehicle sensor.

5. The vehicle control system according to claim 1, wherein the processor is further operable to, based on the analyzed image data, determine an optimal illumination intensity of the at least one taillight, and the processor is further operable to generate a second control signal to adjust the illumination intensity of at least one taillight.

6. The vehicle control system according to claim 5, wherein the processor is operable to generate the second control signal based on the detection of at least one of snow, fog, rain, and/or ambient conditions, in the image data.

7. The vehicle control system according to claim 1, wherein the processor is further operable to determine roadway conditions; and
wherein the processor is further operable to generate a second control signal to adjust the illumination pattern of at least one taillight based on the determined roadway conditions.

8. The vehicle control system according to claim 7, wherein the determined roadway condition is at least one of a curved, straight, single lane, multi-lane, hill or sloped road.

9. The vehicle control system according to claim 1, wherein the at least one characteristic of a trailing vehicle is the location of the trailing vehicle relative to the vehicle.

10. The vehicle control system according to claim 9, wherein the processor is operable to:
analyze the image data by analyzing a first image frame and a subsequent image frame;
identify the at least on characteristic of the trailing vehicle based on the subsequent image frame; and
wherein the at least one characteristic comprises a location of the trailing vehicle.

11. A method for a vehicle control system comprising the steps of:
capturing, with an imager, image data corresponding to a field of view rearward of the vehicle;
processing, with a processor, the image data;
identifying, with the processor, at least one characteristic of a trailing vehicle and;
based on the at least one characteristic generating, with the processor, a control signal to adjust an illumination pattern of at least one taillight of the vehicle.

12. The method of claim 11, further comprising:
receiving vehicle location input from at least one vehicle sensor; and
based on the vehicle location input, generating with the processor, the control signal to adjust an illumination pattern of at least one taillight of the vehicle.

13. The method of claim 11, further comprising generating, with the processor, a control signal to adjust an illumination intensity of the taillights based on the analyzed image data.

14. The method of claim 11, wherein generating the control to adjust the illumination pattern by changing an illumination of at least one LED in an LED array.

15. The method of claim 11, wherein generating the control signal comprises generating a control signal to adjust the illumination pattern by a mechanical mechanism operably coupled to the taillight, the mechanical mechanism is configured to rotate or pan at least one taillight to the desired illumination pattern.

16. The method of claim 11, wherein the at least one characteristic of a trailing vehicle comprises a location of the trailing vehicle relative to the vehicle equipped with the vehicle control system; and wherein generating the control signal to adjust the illumination pattern comprises generating the control signal based at least in part on the location of the trailing vehicle.

17. A vehicle control system comprising:
an image sensor operable to capture image data corresponding to a field of view rearward of a vehicle;
a processor in communication with the image sensor, wherein the processor is operable to:
receive the image data from the image sensor;
analyze the image data;
based on the analyzed image data, identify at least one characteristic of a roadway; and
based on the identified characteristic of the roadway, generate a control signal to adjust an illumination pattern of at least one taillight of the vehicle.

18. The vehicle control system according to claim 17, wherein the characteristic of the roadway is at least one of a curved, straight, single lane, multi-lane, hill or sloped road.

19. The vehicle control system according to claim 17, wherein the processor is operable to generate a control signal to adjust the illumination pattern to illuminate an optimal portion of the roadway.

20. The vehicle control system according to claim 17, wherein the processor is operable to generate a control signal to adjust an illumination intensity of the taillights based on the detection of at least one of snow, fog, rain, and/or ambient conditions, in the image data.

21. A vehicle control system comprising:
a transceiver configured to send and receive wireless communication for at least one surrounding vehicle; and
a processor in communication with the transceiver, wherein the processor is operable to:
receive the vehicle wireless communication;
analyze the vehicle wireless communication;
based on the analyzed wireless communication, identify the location of the last least one surrounding vehicle relative to the control vehicle; and
based on the identified location of the at least one surrounding vehicle, generate a control signal to adjust an illumination pattern of at least one taillight of the control vehicle.

\* \* \* \* \*